June 10, 1930.  J. WASELUK  1,762,846
APPARATUS FOR TREATING RUBBER ARTICLES
Filed April 2, 1927
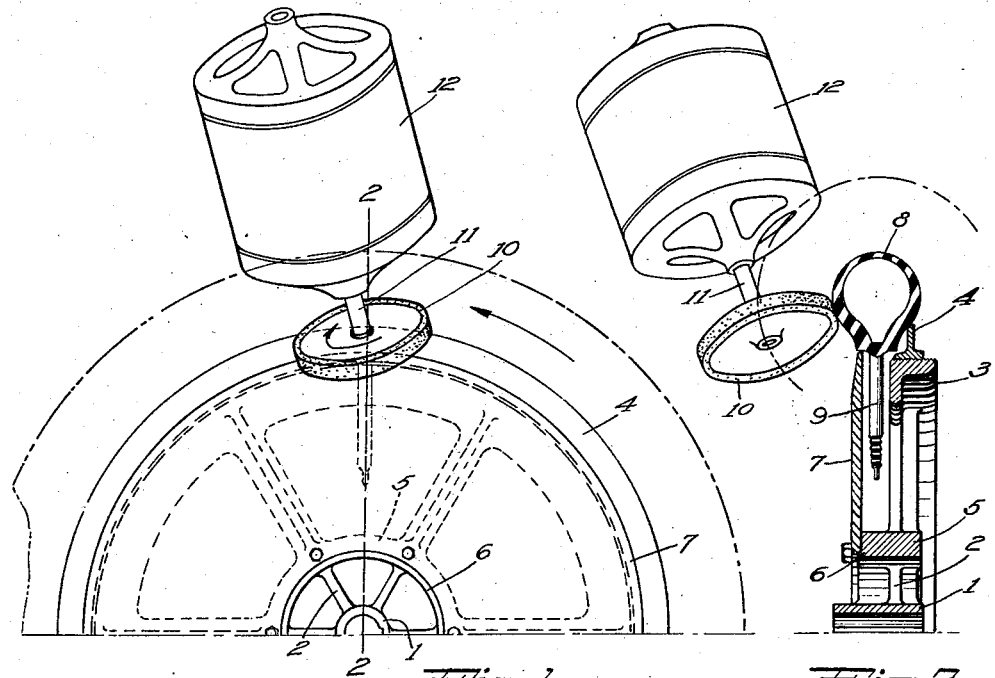
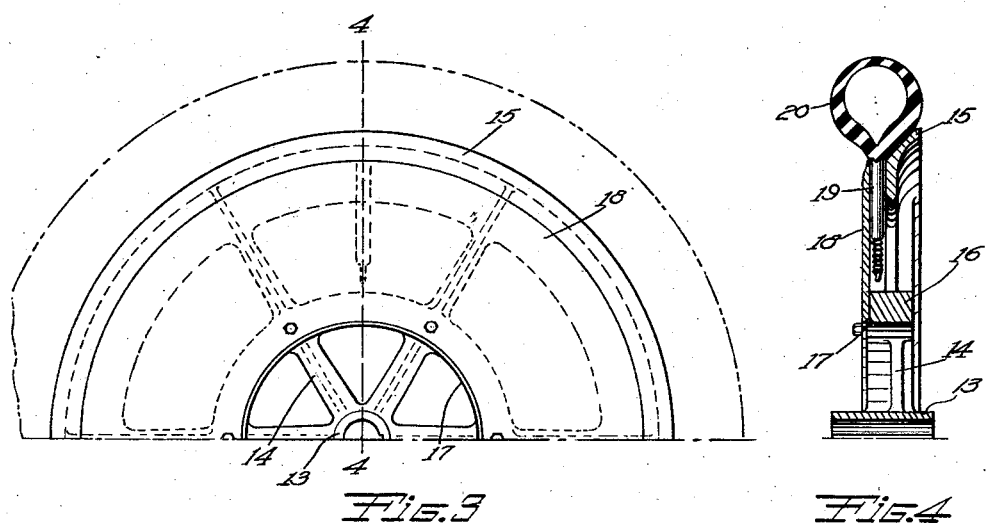
INVENTOR
Jacob Waseluk
BY
ATTORNEY Patented June 10, 1930

1,762,846

UNITED STATES PATENT OFFICE

JACOB WASELUK, OF DETROIT, MICHIGAN, ASSIGNOR TO MORGAN AND WRIGHT, OF DETROIT, MICHIGAN, A CORPORATION OF MICHIGAN

APPARATUS FOR TREATING RUBBER ARTICLES

Application filed April 2, 1927. Serial No. 180,507.

This invention relates to a device for supporting annular articles while buffing the surface thereof. More particularly it relates to a device for supporting and revolving a curing bag while abrading its surface.

It is customary to recondition the curing bags used in vulcanizing certain types of pneumatic tires by buffing off the outside surface of the same after which the bags are recovered for further use. A convenient method of supporting the bag while buffing the same has been to loosely mount the bag upon a rotatable wheel, securing it merely by engagement of the valve stem with a hole in the periphery of the wheel. The wheel is rotated and a buffing wheel is applied to the surface of the curing bag. During this operation, the curing bag tends to creep on the rotating wheel and to bulge adjacent the valve stem. When the buffer strikes the bulged portion of the curing bag, it gouges into the bag.

It is an object of this invention to provide a mounting for a curing bag whereby bulging during the buffing operation will be obviated. It is a further object to provide a mounting for a curing bag which will permit of rapid assembly and dis-assembly of the bag upon the mounting. Other objects will be apparent from the specification and from the accompanying drawings in which latter:

Fig. 1 is a front elevation of a rotatable frame for supporting the type of curing bag used in curing a straight side tire;

Fig. 2 is a transverse section upon the line 2—2 of Fig. 1 showing a curing bag positioned upon the frame;

Fig. 3 is a front elevation of a rotatable frame for supporting a curing bag used in vulcanizing a clincher tire; and Fig. 4 is a transverse section along the line 4—4 of Fig. 3 with a curing bag in position upon the frame.

Referring particularly to Figs. 1 and 2, the frame comprises a hub 1 which is adapted to be keyed or otherwise secured upon a rotary shaft. Spokes 2 extend radially from the hub to a flanged rim 3. An adjusting ring 4 to accommodate curing bags of different profiles or cross sections is adapted to be secured upon the outer periphery of the rim 3 by a screw threaded connection. A secondary hub 5 is carried by the spokes 2 intermediate the hub 1 and rim 3 and one side thereof carries the annular flange 6. A disc 7 is adapted to be secured by bolts or otherwise to one face of the secondary hub 5 abutting against the flange 6. The outer edge of the disc 7 forms an annular support for the rim surface of a curing bag 8 at one side of the valve stem 9. Upon the other side of the valve stem, the curing bag is supported by the adjusting ring 4, the position of which with respect to the disc 7 can be varied by means of the screw threads. The disc 7 is spaced from the rim 3 a suitable distance to permit of freedom of movement of the valve stem therebetween.

Means for buffing the curing bag 8 are had in a buffing wheel 10 which is suitably mounted for rotation upon a shaft 11 which is driven by a motor 12. The motor 12 is suitably mounted by any convenient means (not shown) for movement in an arc about the curing bag shown by the dot and dash line in Fig. 2.

In Figs. 3 and 4 there is shown a modification of the supporting frame whereby the same is adapted for carrying a curing bag used in curing the clincher type tire. In this modification the device comprises a hub 13 from which spokes 14 radially project and terminate in an annular rim 15, the upper surface of which extends diagonally from the plane of the spokes. The base of the annular rim 15 is adapted to be engaged by the rim surface of a clincher type air bag and the upper surface of the rim 15 serves as a support for the side wall of the curing bag. The rim functions to limit lateral axial movement of the curing bag. A secondary hub 16 is carried by the spokes 14 intermediate the hub 13 and rim 15 and a flange 17 projects laterally from the base of the hub. An annular disc 18 is secured to the side of the secondary hub by any suitable means and abuts against the flange 17. The annular disc 18 extends outwardly to a position even with the base of the rim 15. The annular disc 18 is spaced from the rim 15 a distance such that the valve stem 19 of the curing bag 20 can be positioned therein with freedom of movement, but sufficiently close together for the rim surface of the curing bag to rest upon the outer periphery thereof.

In the operation of the machine, a curing bag is positioned upon the frame either by inserting the valve stem through a slot in the retaining disc or by assembling the valve stem in the annular groove by vertical movement thereof. The supporting frame with the curing bag thereon is rotated. The buffing wheel 10 rotating in the opposite direction to the curing bag, is applied to the surface thereof and is gradually moved peripherally about the curing bag as indicated by the dot and dash line Fig. 2. The surface of slightly more than half of the curing bag is buffed by this operation, after which the buffing wheel 10 is removed. The curing bag is then reversed upon the supporting frame and the operation of buffing the remaining portion of the curing bag is effected.

While the invention has been particularly described as applied to a device for supporting a curing bag during the operation of buffing the surface thereof, it will be apparent that it can be utilized for supporting various other annular articles such as an assembled tire and tube, and can be used for other processes than that of buffing the surface of the supported article.

Having thus described my invention, what I claim and desire to protect by Letters Patent is:—

1. A device for supporting a curing bag comprising an annular frame mounted for rotary movement, and means secured thereto adapted to cooperate with the frame to support a curing bag, said means and frame being spaced to provide an annular groove to receive the valve stem of the curing bag.

2. A device for supporting a curing bag comprising an annular frame adapted to receive the curing bag and limit axial movement of the same in one direction, said frame being mounted for rotation and provided with an annular groove in its periphery to receive the valve stem of the curing bag.

3. A device for supporting a curing bag comprising a frame substantially annular in form, and means cooperating with the frame to support a curing bag provided with a valve stem, said frame being arranged to clear the valve stem, whereby said curing bag is permitted to creep circumferentially of said frame.

4. A device for supporting a curing bag having a valve stem comprising a substantially annular frame adapted to receive the bag and limit axial movement of the same in one direction, and an adjusting ring movable relative to said frame and cooperating therewith to support the bag, said frame and the ring being arranged to define an annular clearance channel for the valve stem, thereby permitting circumferential creeping of the bag on said frame.

Signed at Detroit, county of Wayne, State of Michigan, this 26th day of March, 1927.

JACOB WASELUK.